(12) United States Patent
Nordé et al.

(10) Patent No.: US 12,158,615 B2
(45) Date of Patent: Dec. 3, 2024

(54) FIBER-OPTIC SPLICE AND METHOD FOR PRODUCING A FIBER-OPTIC SPLICE

(71) Applicant: NKT HV Cables AB, Lyckeby (SE)

(72) Inventors: Niklas Nordé, Karlskrona (SE); Patrik Holmberg, Ronneby (SE); Petrus Althini, Lyckeby (SE)

(73) Assignee: NKT HV Cables AB, Lyckeby (SE)

( * ) Notice: Subject to any disclaimer, the term of this patent is extended or adjusted under 35 U.S.C. 154(b) by 0 days.

(21) Appl. No.: 18/410,772

(22) Filed: Jan. 11, 2024

(65) Prior Publication Data
US 2024/0241322 A1    Jul. 18, 2024

(30) Foreign Application Priority Data

Jan. 16, 2023 (EP) .................................... 23151727

(51) Int. Cl.
    *G02B 6/38*    (2006.01)
(52) U.S. Cl.
    CPC ................................. *G02B 6/3801* (2013.01)
(58) Field of Classification Search
    CPC .................................................... G02B 6/3801
    USPC ......................................................... 385/95
    See application file for complete search history.

(56) References Cited

U.S. PATENT DOCUMENTS 5,592,579 A    1/1997  Cowen et al.
10,520,638 B1 * 12/2019  Lowell .................... G01V 8/02

FOREIGN PATENT DOCUMENTS

DE    102008062848 A1    6/2010

OTHER PUBLICATIONS

Extended European Search Report; Application No. 23151727.7; Completed: Jun. 21, 2023; Issued: Jul. 3, 2023; 5 Pages.

* cited by examiner

*Primary Examiner* — Jerry M Blevins
(74) *Attorney, Agent, or Firm* — Whitmyer IP Group LLC (57) ABSTRACT

A fiber-optic splice having a first fiber-optic cable including a first metal tube, the first metal tube including a first metal material, a splice tube including a second metal material, wherein the splice tube is arranged around the first metal tube, or wherein the first metal tube is arranged around the splice tube, thereby forming a first overlap section between the splice tube and the first metal tube, and a first coating including a third metal material, the third metal material being different from the first metal material and the second metal material, the first coating being arranged at an inner surface of the splice tube or at an outer surface of the splice tube in the first overlap section, and wherein the inner surface of the splice tube or the inner surface of the first metal tube includes a first radial deformation providing contact between the splice tube and the first metal tube via the first coating in the overlap section, so that a hydrogen tight seal is achieved between the first metal tube and the splice tube.

22 Claims, 5 Drawing Sheets

FIBER-OPTIC SPLICE AND METHOD FOR PRODUCING A FIBER-OPTIC SPLICE

TECHNICAL FIELD

The present disclosure generally relates to a splice. In particular, a fiber-optic splice and a method for producing a fiber-optic splice, are provided.

BACKGROUND

In fiber-optic cables one or more thin strands of optical fibers, such as glass fibers or plastic fibers, act as a waveguide for light over long distances. The cables could for example be used for data-transmission.

The optical fibers are fragile and thus generally have to be protected. One way of protecting the optical fibers is by providing one or more metal tubes around the fibers. A fiber-optic cable comprising such metal tubing can be referred to as a Fiber in Metal Tube (FIMT). In addition to providing mechanical stability, the metal tube protects the optical fibers from ingress of water and/or hydrogen, which can be particularly useful in harsh environment, such as in subsea applications.

When the FIMT is to cover large distances, splicing of the cables is sometimes necessary, for example due to limitations in machinery reel size. One known way of splicing FIMT metal tubes is to provide a polymer adhesive over an overlap section between the metal tubes.

It has been realized that when using a polymer adhesive to splice fiber-optic metal tubes, problems might arise with ingress of water and hydrogen through the polymer material, which could lead to damage to the metal tube and to the optical fibers.

Furthermore, in the known methods for producing a fiber-optic splice, the adhesive is provided onto the surface of the metal tube in connection with splicing, which adds to the complexity of the splicing procedure.

SUMMARY

In view of the above, an objective of the present solution is to provide a fiber-optic splice and a method for producing a fiber-optic splice that solves or at least mitigates the problems of the prior art.

Thus, according to a first aspect, a fiber-optic splice is provided. The fiber-optic splice comprises a first fiber-optic cable comprising a first metal tube, the first metal tube comprising a first metal material; a splice tube comprising a second metal material, the second metal material preferably being the same as the first metal material, wherein the splice tube is arranged around the first metal tube, or wherein the first metal tube is arranged around the splice tube, thereby forming a first overlap section between the splice tube and the first metal tube. The fiber-optic splice further comprises a first coating comprising a third metal material, the third metal material being different from the first metal material and the second metal material, the first coating being arranged at an inner surface of the splice tube or at an outer surface of the splice tube in the first overlap section, wherein the inner surface of the splice tube or the inner surface of the first metal tube comprises a first radial deformation providing contact between the splice tube and the first metal tube via the first coating in the overlap section, so that a hydrogen tight seal is achieved between the first metal tube and the splice tube.

By arranging a coating comprising a metal material in the overlap section, a hydrogen tight seal can be achieved. The term hydrogen tight should be understood as a tightness which is comparable to the rest of the subsea power cable system, that is, the hydrogen ingress at the splice should not be higher than the hydrogen ingress through the metal tubes themselves.

The use of a metal coating in place of a polymer adhesive could further facilitate production of the splice, as the metal could be pre-coated onto the metal tube, thereby removing the step of applying it at the production of the splice.

Furthermore, the metal coating could improve the electrical contact between the fiber-optic cables at the splice as compared to a splice comprising a polymer.

According to an embodiment, the coating is provided at the inner surface of the splice tube. Thereby, splice tube can be precoated prior to the splicing, thus facilitating the splicing process.

According to an embodiment, the coating is only arranged at the intended overlap section. Thereby, costs can be reduced as only the required amount of coating is used.

According to an alternative embodiment, the coating is arranged to cover the entire inner surface of the splice tube. Thereby, application of the coating is facilitated as the coating does not have to be arranged at any certain section. Furthermore, the production of the splice can be facilitated, as it does not have to take the placement of the coating into account. This could allow for precoated splice tubes to be fabricated and stored until a splicing need occurs.

According to one embodiment, the third metal material has a higher malleability than the first metal material and the second metal material.

Thereby, the third metal material could be arranged to deform to a higher degree than the first metal tube and the splice tube during deformation of the splice tube. The third metal material could thus be arranged to fill out any irregularities within the first metal tube and the splice tube at the splice.

With malleability is meant that the third material has a lower yield strength than the first metal material and the second metal material. The Young's modulus of the third material may also be smaller than that of the first metal material and the second metal material.

According to one embodiment, the third metal material comprises at least one of lead, tin, silver, copper, gold, nickel, and indium.

According to one embodiment, at least one of the first metal material and the second metal material comprises stainless-steel.

The stainless-steel could for example comprise stainless steel type 304, 316 or 316L.

According to another embodiment, the first metal material and the second metal material could comprise Alloy 625.

According to one embodiment, the first radial deformation has been made by crimping or swaging.

The crimping could be used to mechanically lock the outer tube, i.e., one of the splice tube and the first metal tube, to the inner tube, i.e., the other one of the splice tube and the first metal tube, while the swaging could provide a continuous contact surface between the tubes, via the metal coating, thus further improving the tightness of the seal. As the outer metal tube is deformed towards the inner metal tube the coating is thus arranged to be compressed and to flow out to fill out any irregularities, such as microscopic surface irregularities and cracks, in the surfaces of the tubes. The irregularities could exist already prior to the deformation, or they could form during the deformation.

According to one embodiment, only the outer metal tube, such as the splice tube, and the coating are deformed.

According to an alternative embodiment, both the outer metal tube, the coating and the inner metal tube are deformed. In this case, the outer metal tube is preferably deformed to a higher degree than the inner metal tube.

According to one embodiment, the third metal material is at the deformation mainly arranged within the microscopic surface irregularities at the splice.

According to one embodiment, the fiber-optic splice comprises a second radial deformation in the first overlap section, the second radial deformation being axially spaced apart from the first radial deformation.

Thereby, the coating could, in addition to being arranged to fill out any irregularities at the radial deformations, be arranged to fill out the space between the first radial deformation and the second radial deformation, which could further improve the hydrogen tightness and durability of the fiber-optic splice.

According to one embodiment, the second radial deformation is deeper than the first radial deformation, and the second radial deformation is arranged closer to the end of the splice tube. Thereby, the radial deformation which is of the highest risk to be exposed to moisture and hydrogen is dimensioned to better resist this.

According to one embodiment the fiber-optic splice further comprises a second fiber-optic cable, the second fiber-optic cable comprising a second metal tube, the second metal tube comprising the same metal material as the first metal tube, wherein the splice tube is arranged around the second metal tube, or wherein the second metal tube is arranged around the splice tube, thereby forming a second overlap section, at an opposite end of the splice tube as compared to the first overlap section; and a second coating, the second coating comprising the same metal material as the first coating, the second coating being arranged at an inner surface of the splice tube or at an outer surface of the second splice tube in the second overlap section; and wherein the inner surface of the splice tube, or the inner surface of the second metal tube, has a third radial deformation providing contact between the splice tube and the second metal tube via the second coating in the second overlap section, so that a hydrogen tight seal is achieved between the second metal tube and the splice tube.

Thereby, a fiber-optic splice with a hydrogen tight seal is produced between a first fiber-optic cable and a second fiber-optic cable, via the splice tube.

According to one embodiment, the second coating is the same as the first coating.

That is, the first coating and the second coating create a continuous coating on the surface of the splice tube. The first coating and the second coating are thus not spaced apart or arranged at a distance from each other.

According to one embodiment, the first fiber-optic cable and the second fiber-optic cable comprise optic fibers, and the splice tube is arranged to cover a junction between the optic fibers of the first fiber-optic cable and the second fiber-optic cable.

According to a second aspect, a method for producing a fiber-optic splice is provided, the method comprising:
provided a first fiber-optic cable comprising a first metal tube, the first metal tube comprising a first metal material,
providing a splice tube, the splice tube comprising a second metal material, the second metal material preferably being the same as the first metal material, wherein an inner surface of the splice tube or an outer surface of the splice tube is provided with a first coating, the first coating comprising a third metal material, the third metal material being different from the first metal material and the second metal material,
arranging the splice tube around the first metal tube, or arranging the first metal tube around the splice tube, in a first overlap section between the splice tube and the first metal tube, and
deforming the splice tube towards the first metal tube, or deforming the first metal tube towards the splice tube, in the first overlap section, so that a hydrogen tight seal is achieved between the first metal tube and the splice tube.

Effects and features of the second aspect of the invention are largely analogous to those described above in connection with the first aspect.

According to one embodiment the third metal material has a higher malleability than the first metal material and the second metal material.

According to one embodiment, the step of deforming the splice tube or the first metal tube comprises crimping or swaging of the splice tube or the first metal tube.

According to one embodiment, the method further comprising the steps of:
providing a second fiber-optic cable comprising a second metal tube, the second metal tube comprising the same metal material as the first metal tube, wherein an inner surface of the splice tube or an outer surface of the first metal tube is provided with a second coating, the second coating comprising a third metal material, the third metal material being different from the first metal material and the second metal material,
arranging the splice tube around the second metal tube in a second overlap section, and
deforming the splice tube towards the second metal tube in the second overlap section, or deforming the second metal tube towards the splice tube in the second overlap section, so that a hydrogen tight seal is achieved between the second metal tube and the splice tube.

According to one embodiment the first fiber-optic cable and the second fiber optic cable comprise optic fibers, and the splice tube is arranged to cover a splicing between the optic fibers of the first fiber-optic cable and the second fiber-optic cable.

Thereby, during production of the fiber-optic splice, the splice tube could first be arranged around the first metal tube whereby the fiber optics could be accessed and spliced together. The splice tube could then be arranged around the fibers by sliding the splice tube into place, protecting the spliced optic fibers.

According to a third aspect, a power cable comprising a fiber-optic splice in accordance with the first aspect is provided.

Effects and features of the third aspect of the invention are largely analogous to those described above in connection with the first aspect.

According to one embodiment, the power cable is a submarine power cable.

To use the fiber-optic splice in a submarine power cable may be particularly relevant as these cables are often exposed to harsh environments with a high risk of hydrogen ingress.

Generally, all terms used in the claims are to be interpreted according to their ordinary meaning in the technical field, unless explicitly defined otherwise herein. All references to "a/an/the element, apparatus, component, means, etc.," are to be interpreted openly as referring to at least one instance of the element, apparatus, component, means, etc., unless explicitly stated otherwise.

BRIEF DESCRIPTION OF THE DRAWINGS

Further details, advantages and aspects of the present disclosure will become apparent from the following description taken in conjunction with the drawings, wherein.

DETAILED DESCRIPTION

The inventive concept will now be described more fully hereinafter with reference to the accompanying drawings, in which exemplifying embodiments are shown.

Figure 1:
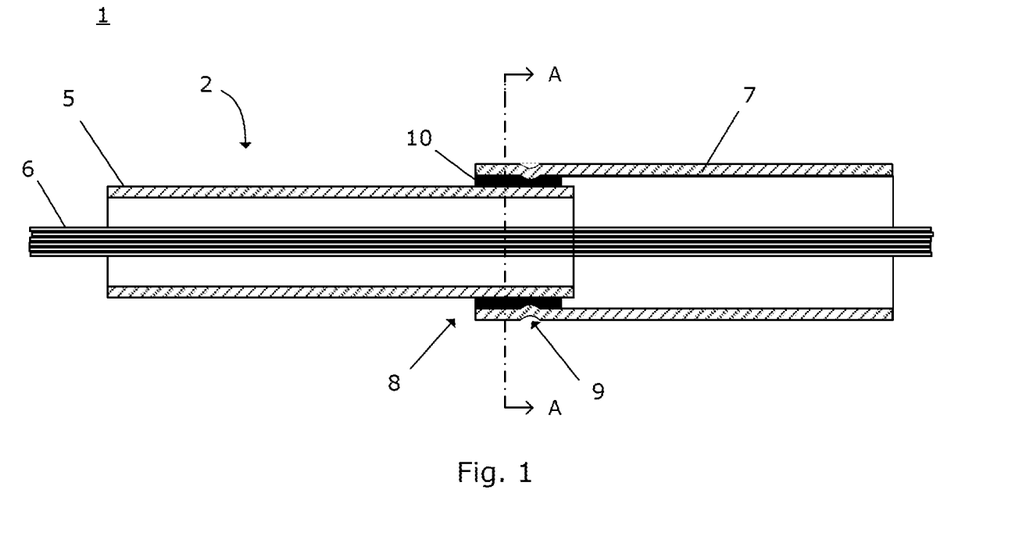
FIG. 1 is a side view of an example fiber-optic splice.
Figure 2:
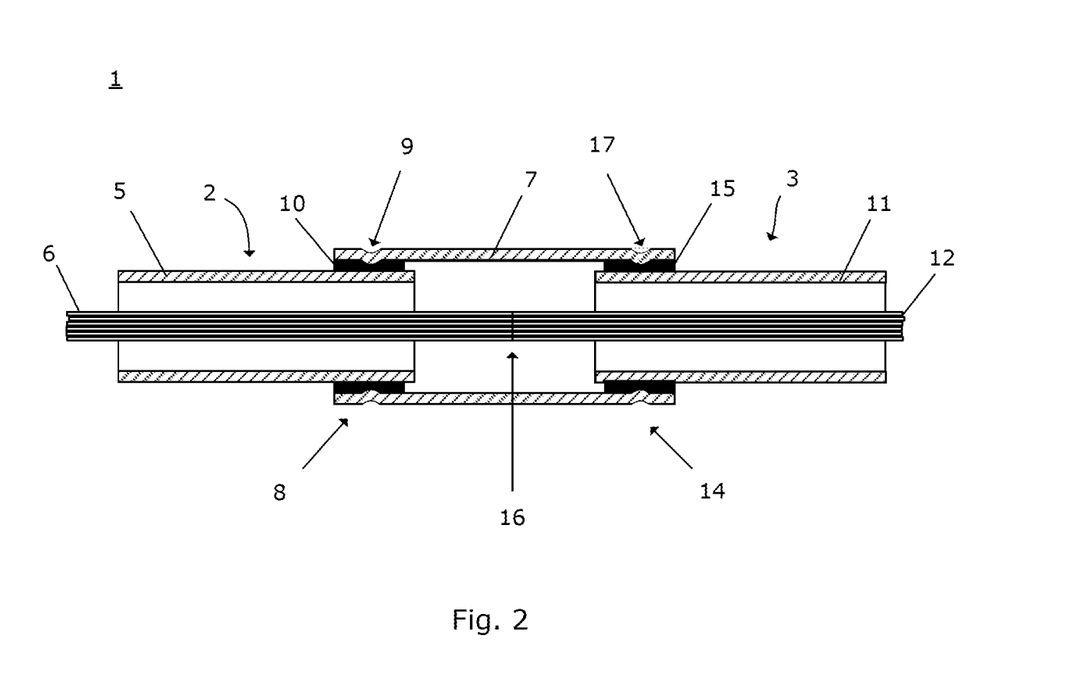
FIG. 2 is a side view of a fiber-optic splice according to a second example embodiment.

FIG. 1 shows an example of a fiber-optic splice 1 between a first fiber-optic cable 2 and a splice tube 7. The first fiber-optic cable 2 in FIG. 1 comprises a plurality of optical fibers 6 and a first metal tube 5 surrounding the optical fibers 6. The splice tube 7 could be used to splice the first fiber-optic cable 2 to a terminal (not shown) or to a second fiber-optic cable 3 (as shown in FIG. 2).

The optical fibers 6 could for example comprise glass fiber strands.

The first metal tube 5 is made of a first metal material. The splice tube 7 is made of a second metal material. The first metal material 5 and the second metal material 7 are preferably suitable for protecting the first fiber-optic cable 2 against both mechanical impact and other environmental aspects, such as moist. According to one example, the first metal material and the second metal material comprise stainless steel.

In the fiber-optic splice 1 of FIG. 1 the splice tube 7 has a larger diameter than the first metal tube 5. The splice tube 7 is thus arranged to surround the first metal tube 5 in a first overlap section 8. The first overlap section 8 has an extension long enough to be able to provide for a firm connection and seal between the splice tube 7 and the first metal tube 5.

A first coating 10 is provided in the first overlap section 8 between the inner surface of the splice tube 7 and the outer surface of the first metal tube 5. The first coating 10 has preferably been applied to the inner surface of the splice tube 7 prior to arranging the splice tube 7 around the first metal tube 5.

Thus, the splice tube 7 may according to one example comprise the first coating 10.

The splice tube 7 has a first radial deformation 9 in the overlap section 8. The first radial deformation 9 deforms the splice tube 7 towards the first metal tube 5. The first radial deformation 9 also deforms the first coating 10 in the overlap section 8 in such a way that the first coating 10 is pushed to the sides, but also into the small surface irregularities in the overlap section 7. The depth of the first radial deformation 9 and the thickness and material of the first coating 10 can be decided at a design stage to achieve optimal mechanical, electrical and/or sealing properties.

In FIG. 1 the first radial deformation 9 is illustrated as a swaged deformation. The swaged deformation comprises a circumferentially extending groove provided in the outer surface of the splice tube 7. The first radial deformation 9 provides a continuous contact between the splice tube 7 and the first metal tube 5, via the first coating 10, in the first overlap section 8 along the entire circumference of the splice tube 7. The first radial deformation 9 could further comprise a crimped deformation (not shown), the crimped deformation could comprise one or more crimps on the splice tube 7, for mechanically locking the splice tube 7 to the first metal tube 5.

In FIG. 1, the deformation is provided on the splice tube 7, while the first metal tube 5 is undeformed or used to sprung back towards the first coating 10 and the splice tube 7. However, in other embodiments, both the splice tube 7 and the first metal tube 5 could be deformed.

In a preferred example, the first coating 10 comprises a third metal material. The third metal material has a higher malleability than the first and second metal material. The higher malleability of the third metal material increases the ability of the first coating to fill out irregularities during deformation, as the material can be deformed to a high degree during compression before breaking. According to a preferred example, the third metal material comprises silver. Other examples of suitable materials are lead, tin, copper, gold, nickel, and indium.

FIG. 2 shows another example of a fiber-optic splice 1 according to the present disclosure. In addition to the first fiber-optic cable 2 and the splice tube 7, the fiber-optic splice 1 in FIG. 2 comprises a second fiber-optic cable 3. The second fiber-optic cable 3 comprises a plurality of optical fibers 12 and a second metal tube 11 surrounding the optical fibers 12. The splice tube 7 has a larger diameter than the first metal tube 5 and the second metal tube 11 respectively. At a first end of the splice tube 7, the splice tube 7 is arranged around the first metal tube 5 to provide the first overlap section 8 between the splice tube 7 and the first metal tube 5. At a second end of the splice tube 7, arranged at an opposite end of the splice tube 7 as compared to the first end, a second overlap section 14 is provided between the splice tube 7 and the second metal tube 11. A second coating 15 is arranged at the second overlap section 14. The splice tube 7 covers a splice 16 between the optical fibers 6 of the first fiber-optic cable 2 and the optical fibers 12 of the second fiber-optic cable 3. The splice tube has a third radial deformation 17 in the second overlap section 14.

Figure 3:
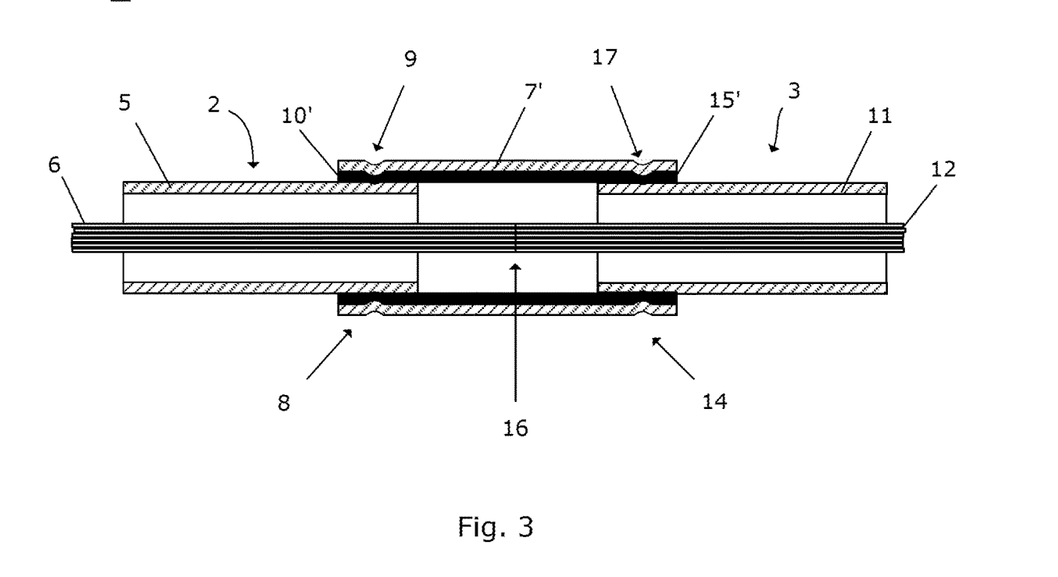
FIG. 3 is a side view of a fiber-optic splice according to a third example embodiment.

FIG. 3 illustrates an alternative embodiment a fiber-optic splice 1'. In FIG. 3. The coating 10', 15' is arranged on the entire inside surface of the splice tube 7'. The first coating 10' and the second coating 15' are thus the same coating in this embodiment, as they form one continuous coating. During production of the splice, the overlap sections 8, 14 and in turn the radial deformations 9, 17 could thus be arranged anywhere along the splice tube 7'.

Figure 4:
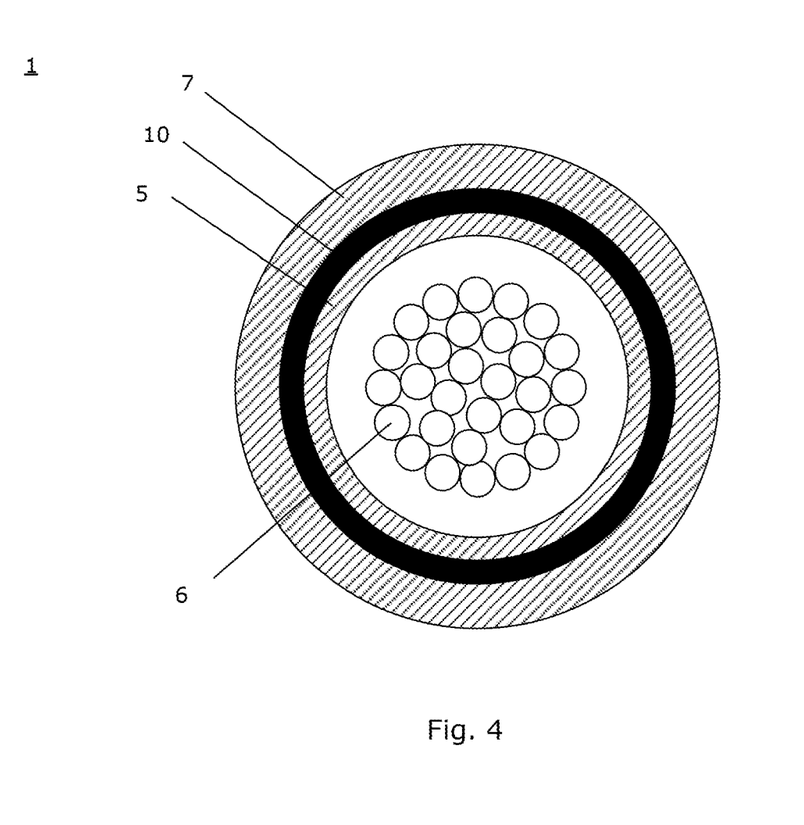
FIG. 4 is a section view of the fiber-optic splice in FIG. 1.

FIG. 4 shows a cross section view along section A-A of the fiber-optic splice 1 in FIG. 1. Starting from the outermost layer, the fiber-optic splice 1 comprises the splice tube 7, the first coating 10, and the first metal tube 5 of the first fiber-optic cable 2. Within the first metal tube 5, the optical fibers 6 of the first fiber-optic cable 2 are schematically illustrated. It is understood that the first fiber-optic cable 2 could also comprise additional layers, such as additional armoring layers and outer polymeric sheath layer.

Figure 5:
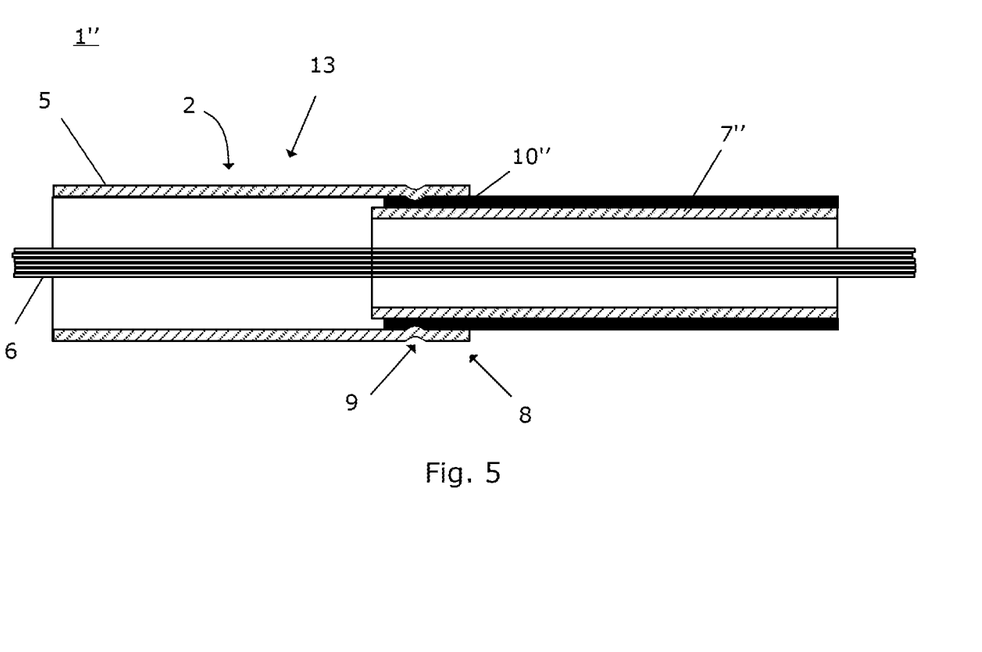
FIG. 5 is a side view of a fiber-optic splice according to a fourth example embodiment.

An alternative example embodiment of a fiber-optic splice 1" is shown in FIG. 5. In this embodiment, the first metal tube 5 is arranged around the splice tube 7". The first coating 10" is thus arranged on an outer surface of the splice tube 7" and the first radial deformation 9 is arranged at the first metal tube 5.

Figure 6:
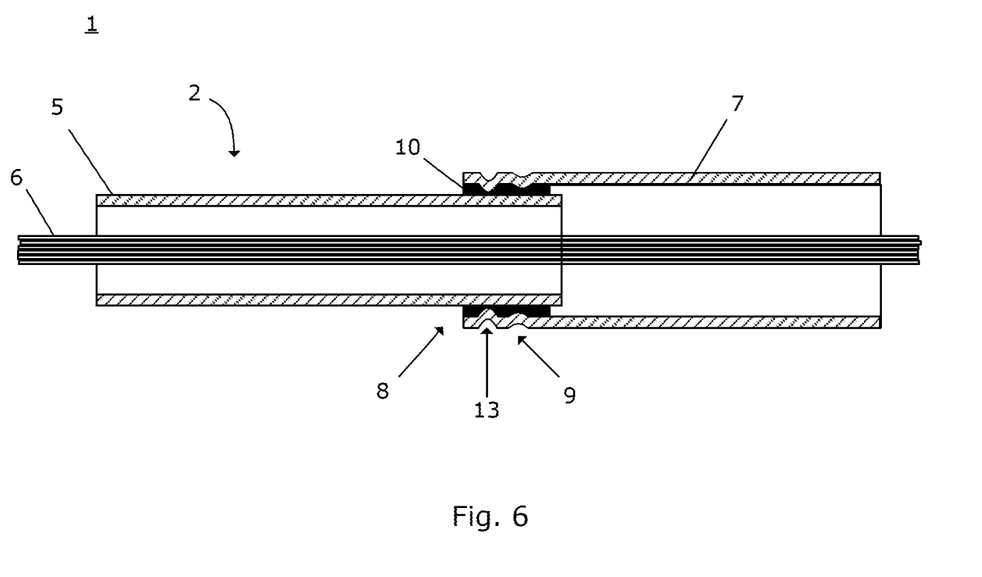
FIG. 6 is a side view of a fiber-optic splice according to a fifth example embodiment.

FIG. 6 presents an alternative embodiment of the fiber-optic splice 1 of FIG. 1 in which the fiber-optic splice 1 comprises a second radial deformation 13 in the first overlap section 8. The second radial deformation 13 is axially spaced apart from the first radial deformation 9. In FIG. 6 the first radial deformation 9 and the second radial deformation 13 are illustrated as swaged deformations. The second radial deformation 13 is arranged closer to the end of the splice tube 7 at the first overlap section 8 and extends deeper into the splice tube 7 and the first coating 10, than the first radial deformation 9. This configuration achieves a hydrogen tight seal and a durable splicing between the first metal tube 5 and the splice tube 7. It is understood that the fiber-optic splice could also include further deformations.

Figure 7:
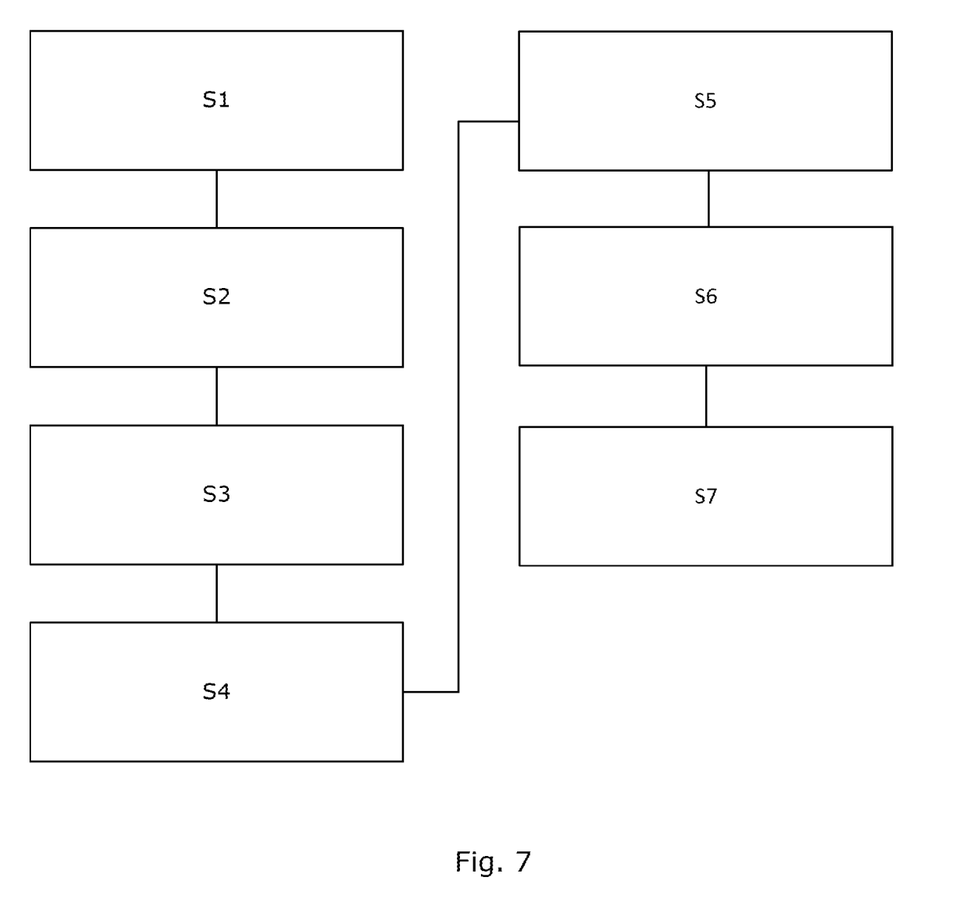
FIG. 7 is a method for producing a fiber-optic splice.

FIG. 7 shows a method for producing a fiber-optic splice 1, such as the fiber-optic splice 1 illustrated in FIG. 2.

In step S1 of the method, the first fiber-optic cable 2, comprising the first metal tube 5, is provided.

In step S2, the splice tube 7 is provided. The surface of the splice tube 7 can at this point already be provided with the first coating 10. Alternatively, the first coating can be applied in an additional step.

In step S3, the splice tube 7 is arranged around the first metal tube 5 in the first overlap section 8. If the fiber-optic splice 1 is to comprise a second fiber-optic cable 3 to which the first fiber-optic cable 2 is to be spliced, the splice tube 7 could in this step first be arranged around the first fiber-optic cable 2 in such a way that the optical fibers 6 of the first fiber-optic cable 2 can be accessed and spliced with the optical fibers 12 of the second fiber-optic cable 3, before arranging the splice tube in the overlap section 8 where it covers the splice of the optical fibers 6, 12.

In step S4, the splice tube 7 is deformed towards the splice tube 5 in the first overlap section 8, so that a hydrogen tight seal is achieved between the first metal tube 5 and the splice tube 7.

In the optional step S5, the second fiber-optic cable 3 comprising the second metal tube 11 is provided. This step could be performed before step S3.

In the optional step S6, the splice tube 7 is arranged around the second metal tube 11 in the second overlap section 14. This step could be performed before step S4.

In step S7 the splice tube 7 is deformed towards the second metal tube 11 in the second overlap section, so that a hydrogen tight seal is achieved between the second metal tube 11 and the splice tube 7.

Figure 8:
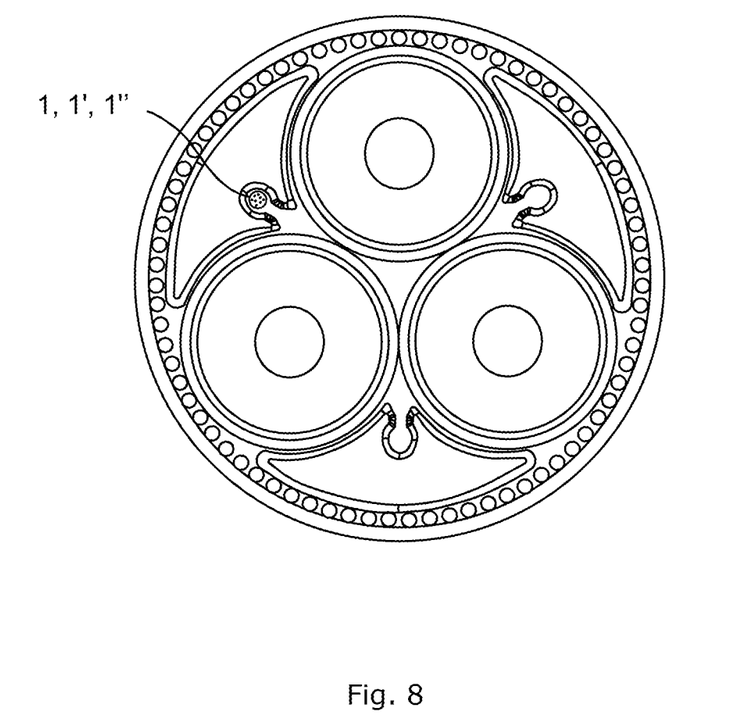
FIG. 8 is a submarine power cable.

In FIG. 8, a submarine power cable comprising the fiber-optic splice 1, 1', 1" of the present disclosure is illustrated. In FIG. 8, the submarine power cable is a 3-core AC cable in which the fiber-optic splice 1, 1', 1" is arranged at in a support structure surrounding the cores. It is understood that other types of power cables, and other placements of the fiber-optic splice 1, 1', 1" within the power cable, are also possible.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A fiber-optic splice comprising:
   a first fiber-optic cable comprising a first metal tube, the first metal tube including a first metal material,
   a splice tube including a second metal material,
   wherein the splice tube is arranged around the first metal tube, or wherein the first metal tube is arranged around the splice tube, thereby forming a first overlap section between the splice tube and the first metal tube, and
   a first coating including a third metal material, the third metal material being different from the first metal material and the second metal material, the first coating being arranged at an inner surface of the splice tube or at an outer surface of the splice tube in the first overlap section, and
   wherein the inner surface of the splice tube or the inner surface of the first metal tube includes a first radial deformation providing contact between the splice tube and the first metal tube via the first coating in the overlap section, so that a hydrogen tight seal is achieved between the first metal tube and the splice tube.

2. The fiber-optic splice according to claim 1 wherein the third metal material has a higher malleability than the first metal material and the second metal material.

3. The fiber-optic splice according to claim 2, wherein the third metal material comprises at least one of lead, tin, silver, copper, gold, nickel, and indium.

4. The fiber-optic splice according to claim 2, wherein at least one of the first metal material and the second metal material includes stainless-steel.

5. The fiber-optic splice according to claim 2, wherein in the first radial deformation has been made by crimping or swaging.

6. The fiber-optic splice according to claim 2, wherein the fiber-optic splice comprises a second radial deformation in the first overlap section, the second radial deformation being axially spaced apart from the first radial deformation.

7. The fiber-optic splice according to claim 1, wherein the third metal material comprises at least one of lead, tin, silver, copper, gold, nickel, and indium.

8. The fiber-optic splice according to claim 1, wherein at least one of the first metal material and the second metal material includes stainless-steel.

9. The fiber-optic splice according to claim 1, wherein in the first radial deformation has been made by crimping or swaging.

10. The fiber-optic splice according to claim 1, wherein the fiber-optic splice comprises a second radial deformation in the first overlap section, the second radial deformation being axially spaced apart from the first radial deformation.

11. The fiber-optic splice according to claim 1, comprising:
    a second fiber-optic cable, the second fiber-optic cable comprising a second metal tube, the second metal tube including the same metal material as the first metal tube
    wherein the splice tube is arranged around the second metal tube, or wherein the second metal tube is arranged around the splice tube, thereby forming a second overlap section, at an opposite end of the splice tube as compared to the first overlap section, and
    a second coating, the second coating including the same metal material as the first coating, the second coating being arranged at an inner surface of the splice tube or at an outer surface of the second splice tube in the second overlap section, and wherein the inner surface of the splice tube, or the inner surface of the second metal tube, has a third radial deformation providing contact between the splice tube and the first second tube via the second coating in the second overlap section, so that a hydrogen tight seal is achieved between the second metal tube and the splice tube.

12. The fiber optic splice according to claim 11, wherein the second coating is the same as the first coating.

13. The fiber-optic splice according to claim 11, wherein the first fiber-optic cable and the second fiber optic cable include optic fibers, and wherein the splice tube is arranged to cover a junction between the optic fibers of the first fiber-optic cable and the second fiber-optic cable.

14. The fiber-optic splice according to claim 1, wherein the second metal material is the same as the first metal material.

15. A method for producing a fiber-optic splice, the method comprising:
   providing a first fiber-optic cable comprising a first metal tube, the first metal tube including a first metal material,
   providing a splice tube, the splice tube including a second metal material, wherein an inner surface of the splice tube or an outer surface of the splice tube is provided with a first coating, the first coating comprising a third metal material, the third metal material being different from the first metal material and the second metal material,
   arranging the splice tube around the first metal tube, or arranging the first metal tube around the splice tube, in a first overlap section between the splice tube and the first metal tube, and
   deforming the splice tube towards the first metal tube, or deforming the first metal tube towards the splice tube, in the first overlap section, so that a hydrogen tight seal is achieved between the first metal tube and the splice tube.

16. The method according to claim 15 wherein the third metal material has a higher malleability than the first metal material and the second metal material.

17. The method according to claim 15, wherein the step of deforming the splice tube or the first metal tube includes crimping or swaging of the splice tube or the first metal tube.

18. The method according to claim 15, further comprising the steps of:
   providing a second fiber-optic cable comprising a second metal tube, the second metal tube including the same metal material as the first metal tube, wherein an inner surface of the splice tube or an outer surface of the first metal tube is provided with a second coating, the second coating including a third metal material, the third metal material being different from the first metal material and the second metal material,
   arranging the splice tube around the second metal tube, or arranging the second metal tube around the splice tube, in a second overlap section, and
   deforming the splice tube towards the second metal tube in the second overlap section, or deforming the second metal tube towards the splice tube in the second overlap section, so that a hydrogen tight seal is achieved between the second metal tube and the splice tube.

19. The method according to claim 18 wherein the first fiber-optic cable and the second fiber-optic cable include optic fibers, and wherein the splice tube is arranged to cover a junction between the optic fibers of the first fiber-optic cable and the second fiber-optic cable.

20. A power cable comprising a fiber-optic splice having a first fiber-optic cable including a first metal tube, the first metal tube including a first metal material,
   a splice tube including a second metal material,
   wherein the splice tube is arranged around the first metal tube, or wherein the first metal tube is arranged around the splice tube, thereby forming a first overlap section between the splice tube and the first metal tube, and
   a first coating including a third metal material, the third metal material being different from the first metal material and the second metal material, the first coating being arranged at an inner surface of the splice tube or at an outer surface of the splice tube in the first overlap section, and
   wherein the inner surface of the splice tube or the inner surface of the first metal tube includes a first radial deformation providing contact between the splice tube and the first metal tube via the first coating in the overlap section, so that a hydrogen tight seal is achieved between the first metal tube and the splice tube.

21. The power cable according to claim 20, wherein the power cable is a submarine power cable.

22. The power cable according to claim 20, wherein the second metal material is the same as the first metal material.

* * * * *